Patented Aug. 25, 1953

2,650,211

UNITED STATES PATENT OFFICE 2,650,211

POLYESTERS OF ALKENYL-SUCCINIC ACIDS

Hans Dannenberg, Berkeley, and James R. Scheibli, San Lorenzo, Calif., assignors to Shell Development Company, San Francisco, Calif., a corporation of Delaware No Drawing. Application May 2, 1949, Serial No. 91,024

7 Claims. (Cl. 260—75)

This invention relates to polyesters and to their use as plasticizers for organic compositions. More particularly, the invention relates to polyesters of hydrocarbon-substituted succinic acids, to a method for their preparation, and to their use as plasticizers, particularly for the cellulose derivatives.

Specifically, the invention provides useful and valuable polyesters of succinic acids having a $C_{18}$ to $C_{26}$ open-chain hydrocarbon radical joined to at least one of the methylene groups of the succinic acid molecule and an alcohol of the group consisting of diethylene glycol, triethylene glycol and higher polyethylene glycols. The invention further provides organic compositions, particularly those containing cellulose derivatives, which are plasticized with the above-described novel polyesters.

Cellulose derivatives, such as cellulose esters and ethers, are utilized in industry in the preparation of many plastic compositions, particularly surface coating compositions. These materials are usually difficult to process and are quite brittle and before they can be utilized for many of their applications it is necessary to add thereto some type of plasticizing agent. The compounds selected as plasticizers for these derivatives should meet certain requirements. They should impart the desired processability and flexibility to the said derivatives and produce plasticized compositions which possess relatively high tensile strengths over wide ranges of conditions, which can withstand long exposures to water, heat and outdoor conditions, and which will not undergo shrinkage or deterioration due to evaporation of the plasticizer.

There have been many compounds suggested as plasticizers for cellulose derivatives in various patents and in the literature, such as dioctyl phthalate, dibutyl phthalate and the polyesters of sebacic acid, but the results obtained by the use of these plasticizers have not been entirely satisfactory. The addition of such plasticizers usually imparts some degree of flexibility and processability to the cellulose derivatives but in many cases the resulting compositions lack many of the more desired properties which are of considerable importance when the derivatives are utilized for their various industrial applications. The cellulose derivatives compounded with many of the suggested plasticizers, for example, have poor resistance to water and in contact therewith begin to deteriorate very rapidly. In addition, the derivatives plasticized with many of the suggested compounds have relatively low tensile strengths and films prepared therefrom are easily broken. Furthermore, the plasticized derivatives usually have poor resistance to outdoors exposure and when placed under such conditions for extended periods of the time lose a greater part of their flexibility and strength.

It is an oject of the invention, therefore, to provide a new and valuable class of plasticizers for the cellulose derivatives. It is a further object to provide plasticized compositions of the cellulose derivatives which have improved resistance to water. It is a further object to provide plasticized compositions containing the cellulose derivatives which have high tensile strengths. It is a further object to provide plasticized compositions of the cellulose derivatives which have improved resistance to outdoor exposure. It is a further object to provide a new class of polyesters. It is a further object to provide novel polyesters which possess many unexpected and beneficial properties. It is still a further object to provide a method for the preparation of the novel polyesters. Other objects and advantages of the invention will be apparent from the following detailed description thereof.

It has now been discovered that these and other objects may be accomplished by the polyesters of succinic acids having a $C_{18}$ to $C_{26}$ open-chain hydrocarbon radical joined to at least one of the methylene groups of the succinic acid molecule and alcohols of the group consisting of diethylene glycol, triethylene glycol and higher polyethylene glycols.

The discovery that these novel polyesters were superior plasticizers for the cellulose derivatives was surprising for it had been previously found that non-drying alkyd resins, such as those derived from sebacic acid, and those prepared from the succinic acids substituted with hydrocarbon radicals containing a smaller number of carbon atoms, were relatively inefficient plasticizers for this type of material and produced compositions lacking many of the above-described superior properties. Evidence of the unexpected superiority of the novel polyesters over these non-drying alkyd resins may be found in the examples cited below.

The hydrocarbon-substituted succinic acids used in producing the novel polyesters of the invention are those succinic acids having one of the hydrogen atoms on at least one of the chain carbon atoms of a succinic acid molecule replaced by an open-chain hydrocarbon radical containing from 18 to 26 carbon atoms. The hydrocarbon radical attached to the methylene group of the succinic acid molecule may be straight chained or branched, and may be saturated or unsaturated. The remaining hydrogen atoms attached to the methylene groups may also be replaced, if desired, with other non-interfering substituents, such as short-chain alkyl and alkenyl radicals, halogen atoms, acyl, alkoxy, and the like radicals. Examples of the hydrocarbon radicals which may be substituted on the succinic acid molecule are octadecenyl, octadecadienyl, 3,5,7-tributyl-2-dodecnyl, 4,6-diisoamyldodecyl, 2-ethyl-4-eicosenyl, nonadecyl, 3,6-nonadecadienyl, 3,6-(3'ethylhexyl)decyl, and docosyl radicals.

Examples of the hydrocarbon-substituted succinic acids which may be used for producing the novel polyesters are 1-octadecenylsuccinic acid, chloro-octadecylsuccinic acid, 3,6-octadecadienylsuccinic acid, methoxyoctadecylsuccinic acid, octadecylsuccinic acid, nonadecenylsuccinic acid, nonadecylsuccinic acid, 3,6-nonadecadienylsuccinic acid, 9,12-octadecadienylsuccinic acid, 3-eicosenylsuccinic acid, 4,7-heneicosenylsuccinic acid, bromodocosylsuccinic acid, docosylsuccinic acid, dioctadecylsuccinic acid, tricosylsuccinic acid, 3,8-tricosadienylsuccinic acid, 3,5,7-docosatrienylsuccinic acid, 2,5-dibutyloctadecylsuccinic acid, 4,6-diisoamyldodecylsuccinic acid, pentacosylsuccinic acid, tetracosenylsuccinic acid, and 3,5,7-tripropyl-2-dodecenylsuccinic acid.

The preferred hydrocarbon-substituted succinic acids to be employed in producing the novel polyesters are the above-described substituted succinic acids wherein one of the hydrogen atoms on one of the chain carbon atoms of the succinic acid molecule has been replaced by an alkyl radical containing from 18 to 22 carbon atoms, preferably having a straight chain of at least 14 carbon atoms, or alkenyl radicals containing from 18 to 22 carbon atoms, preferably having a straight chain of at least 14 carbon atoms and at least one ethylene linkage not more than four carbon atoms removed from the methylene group. Examples of this preferred group of acids are 1-octadecenylsuccinic acid, 3-nonadecenylsuccinic acid, octadecylsuccinic acid, nonadecylsuccinic acid, docosylsuccinic acid, heneicosenylsuccinic acid, and eicosylsuccinic acid, 3,5-diethyloctadecenylsuccinic acid, 4-isoamylheptadecylsuccinic acid, and 6-butyloctadecylsuccinic acid. The anhydride form of the above-described substituted succinic acids may also be used in the preparation of the alkyl resins if desired.

The above-described substituted succinic acids may be produced by any suitable method. The succinic acids containing the unsaturated hydrocarbon radicals are preferably prepared by condensing an olefinic hydrocarbon radical with maleic anhydride at an elevated temperature sufficiently high to promote the reaction, preferably above 200° C., under sufficient pressure to maintain the monoolefins in the liquid phase.

The succinic acids containing the saturated hydrocarbon radicals may be prepared by hydrogenating the corresponding unsaturated substituted acids produced by the above-described condensation reaction with maleic anhydride. This is preferably accomplished by treating the unsaturated substituted acids or their derivatives with hydrogen gas under pressure from 200 to 100 p. s. i. at a temperature between 100° C. and 200° C. in the presence of a hydrogenation catalyst.

The compounds to be reacted with the substituted succinic acids are diethylene glycol, triethylene glycol and higher polyethylene glycols.

In the preparation of the polyesters of the invention any one of the above-described dihydric alcohols may be reacted with any one of the hydrocarbon-substituted succinic acids or a mixture of one or both types of reactants may be utilized.

The alkyd resins of the invention may be prepared by any suitable method. They are preferably prepared by merely heating the desired dihydroxy-containing compound with hydrocarbon-substituted succinic acids. Ordinarily no catalyst need be employed but if desired substances such as p-toluenesulfonic acid, zinc chloride, stannic chloride, calcium acetate, barium acetate, zinc acetate, and hydrochloric acid may be utilized to increase the speed of the reaction. Such catalysts are generally employed in amounts varying from 0.1% to 5% by weight of the reactants.

The quantities of dihydroxy-containing compounds and the substituted succinic acid utilized in producing the novel polyesters may vary over a wide range depending upon the type of product desired. In general, the succinic acids are reacted with an equimolar to 50% excess of the dihydroxy-containing compound. Satisfactory results are usually obtained, however, even when the acid is maintained in excess. Preferably, the acid and alcohol are reacted in molar ratio varying from 1:1.3 to 1.1 to 1, respectively.

The temperature employed during the reaction may vary over a considerable range depending upon the type of reactants, catalysts, ect. In most cases the temperature will range between about 100° C. and about 300° C. with a preferred range varying between 120° C. and 250° C.

The reaction may be accomplished in the presence or absence of diluents. If solvents and diluents are employed it is desirable to utilize inert organic compounds, such as benzene, toluene, xylene, cyclohexane, chloroform, carbon tetrachloride, and the like.

Various types of modifying substances may be added at any stage during the reaction. Examples of such modifying substances are cottonseed fatty acids, castor oil fatty acids, castor oil, phenol-aldehyde, urea-aldehyde resins, colophony, shellac, copal, camphor napthalene, alkyl and aryl phthalates, pitch, asphalt, sand, clay, and the like. The type and amount of the modifying agent added will depend on the intended use of the finished polyester.

In some cases it may be desirable to accomplish the reaction under a blanket of inert gas, at least during the initial stages of the reaction. By an inert gas is meant one substantially devoid of oxygen, such as nitrogen, carbon dioxide, helium, ethane, and the like. Atmospheric, superatmospheric, or subatmospheric pressures may be utilized in the process.

The water formed during the reaction between the dihydroxy-containing compound and the hydrocarbon-substituted succinic acids may be removed during or at the completion of the reaction. It is preferably removed from the reaction substantially as fast as it is formed therein. The removal of the water may be accomplished by any conventional means, such as azeotropic distillation with inert organic compounds as benbene and toluene, and the like.

When the reaction is complete the inert solvents, diluents, water, uncombined reactants, etc., may be removed from the reaction mixture by any suitable means, such as vacuum distillation and fractional dissolution.

The above-described process may be executed in any convenient type apparatus enabling the maintenance of the proper conditions and the introduction of the various reactants. The process may be carried out in batch, semi-continuous or continuous manner. For large scale production it is preferred to conduct the process in a continuous manner.

To illustrate the preparation of the novel polyester the following examples are cited. It should be understood, however, that the examples are for the purpose of illustration and should not be regarded as limiting the invention in any way.

Example I

About 100 moles of octadecene-1 and 100 moles of maleic anhydride were heated in a steel bomb and shaken for 6 hours at 250° C. The reaction production was then heated in vacuo for removal of the unchanged anhydride and olefin.

About 100 parts of octadecenylsuccinic anhydride produced above are mixed with about 50 parts of diethylene glycol and the resulting mixture heated in an atmosphere of carbon dioxide. The temperature is raised from 170° C. to 250° C. and held at that temperature until the reaction is substantially complete. The unreacted diethylene glycol is removed by distillation. The resulting product is a viscous liquid polyester.

Example II

About 150 parts of eicosenylsuccinic acid are mixed with about 65 parts of triethylene glycol and the resulting mixture heated as shown in the preceding example. The resulting product is a viscous liquid polyester.

Example III

A polyester is prepared by reacting 1 mol of octadecenyl-succinic acid with 1.2 mols of polyethylene glycol. This mixture is heated over a range of 150° C. to 260° C. and maintained at that temperature until the reaction is complete. The resulting product is a viscous liquid polyester.

The polyesters of the invention are useful in industry in a great many applications, such as diluents, modifying agents, lubricants, tackifiers, and resin plasticizers. Resins which may be plasticized with the novel polyesters include the urea-aldehyde or melamine-aldehyde type resins, such as those prepared by reacting urea, thiourea, 1,4-butylene diurea, and the like with aldehydes as formaldehyde, acetaldehyde, and propionaldehyde. The novel polyesters are particularly valuable, however, as plasticizers for the cellulose derivatives. When utilized in this capacity they form compounded compositions having many superior properties described hereinabove.

Cellulose derivatives which may be plasticized with these novel polyesters may be exemplified by cellulose nitrate, cellulose acetate, cellulose acetate butyrate, cellulose propionate, cellulose isobutyrate, cellulose crotonate, cellulose aceto-butyrate, cellulose stearate, and cellulose valerate, ethyl cellulose, methyl cellulose, butyl cellulose, benzyl cellulose, glycol cellulose, cellulose aceto-stearate, cellulose aceto-propionate, cellulose aceto-tartarate, and mixtures thereof.

A single polyester may be used as the plasticizer or a mixture of two or more may be utilized. The amount of the polyesters to be incorporated with the above-described cellulose derivatives may vary over a considerable range depending upon the particular type of polyester employed and the intended use of the finished product. In most cases the amount of the plasticizer added will vary from about 5 parts to 150 parts by weight for every 100 parts of cellulose derivative. A more preferred range of plasticizer to be used comprises 20 parts to 75 parts per 100 parts of cellulose derivative.

If the cellulose derivatives are to be used for the preparation of surface coating compositions the resins may be incorporated therewith by adding the polyesters and cellulose derivatives to the solvent employed in the preparation of the said coatings, such as acetone, butyl acetate, ethylene glycol ethyl ether, toluene, and the like, or mixtures thereof. If the cellulose derivatives are to be used for the preparation of plastic sheets the plasticizers may be incorporated therein by kneading or rolling the two ingredients together by the conventional methods.

Modifiers, such as whiting, clay, gum rosin, silica, oxides of bismuth, barium oxide, and other compounds may be added to the cellulose derivatives along with, or before, the addition of the novel polyesters of the invention. Quantities of the conventional plasticizers, such as dioctyl phthalate, dibutyl phthalate, tricresyl phosphate, and the like may also be added with the polyester.

The plasticized compositions described above may be utilized for a great variety of purposes in industry. They may be used, for example, in the preparation of lacquers for coating wood, paper, and metals, in the preparation of dopes for coating fabrics, in varnishes and paints, and in plastic compositions utilized in the preparation of rigid plastic articles, sheets, tubes, rods, and the like.

The following examples illustrate the use of the novel polyesters as plasticizers for the cellulose derivatives. The examples are cited for the purpose of illustration and should not be regarded as limiting the invention in any way.

Example IV

A coating composition is prepared by mixing 55 parts of the polyester of octadecenylsuccinic anhydride and diethylene glycol prepared in Example I with 45 parts of cellulose acetate in a solvent composed of 80% methyl ethyl ketone and 20% methanol. Free films of this composition are prepared and tested for tensile strength and tin panels coated with the composition are tested for water resistance. The films show a high tensile strength and good resistance to water.

Example V

A coating composition of ethyl cellulose is prepared by combining the ethyl cellulose with a polyester of eicosenylsuccinic acid and triethylene glycol. Tin panels are coated with this composition and dried under constant temperature and humidity. The coatings show good resistance to water and inclement weather conditions.

We claim as our invention:

1. A polyester obtained by heating and reacting octadecenylsuccinic anhydride with an equal molecular to 30% excess of diethylene glycol.

2. A polyester obtained by heating and reacting a succinic acid having an alkenyl radical containing from 18 to 26 carbon atoms substituted on at least one of the chain carbon atoms of the succinic acid molecule with an equal molecular to 30% excess of diethylene glycol.

3. A polyester obtained by heating and reacting a succinic acid having an alkyl radical containing from 18 to 26 carbon atoms substituted on at least one of the chain carbon atoms of the succinic acid molecule with an equal molecular to 30% excess of diethylene glycol.

4. A polyester obtained by heating and reacting an acid component of the group consisting of succinic acids having an open-chain hydrocarbon radical containing from 18 to 26 carbon atoms substituted on at least one of the chain carbon atoms of the said succinic acid molecule, and anhydrides thereof with an alcohol of the group consisting of diethylene glycol, triethylene glycol and higher polyethylene glycols, wherein the acid component and the alcohol are combined in the molar ratio of 1:1.3 to 1.1:1.

5. A process comprising heating and reacting octadecenylsuccinic anhydride in an inert atmosphere with an equal molecular to 30% excess of diethylene glycol, said heating being accomplished at a temperature between 100° C. and 300° C.

6. A process comprising heating a succinic acid having an alkyl radical containing from 18 to 26 carbon atoms substituted on at least one of the chain carbon atoms of the said succinic acid molecule, with an equal molecular to 30% excess of diethylene glycol, said heating being accomplished at a temperature between 100° C. and 300° C.

7. A process comprising heating an acid component of the group consisting of succinic acids having an open-chain hydrocarbon radical containing from 18 to 26 carbon atoms substituted on at least one of the chain carbon atoms of the said succinic acid molecule, and anhydrides thereof, with an alcohol of the group consisting of diethylene glycol, triethylene glycol and higher polyethylene glycols, wherein the acid component and the alcohol are combined in the molar ratio of 1:1.3 to 1.1:1.

HANS DANNENBERG.
JAMES R. SCHEIBLI.

References Cited in the file of this patent

UNITED STATES PATENTS

| Number | Name | Date |
|---|---|---|
| 2,191,530 | Hucks | Feb. 27, 1940 |
| 2,214,667 | Ensminger | Sept. 10, 1940 |
| 2,388,318 | Frosch | Nov. 6, 1945 |
| 2,394,909 | Gleason | Feb. 12, 1946 |
| 2,454,862 | Collins | Nov. 30, 1948 |